June 11, 1929.  W. N. BOOTH  1,716,915
RIM TOOL
Filed May 4, 1925   2 Sheets-Sheet 1
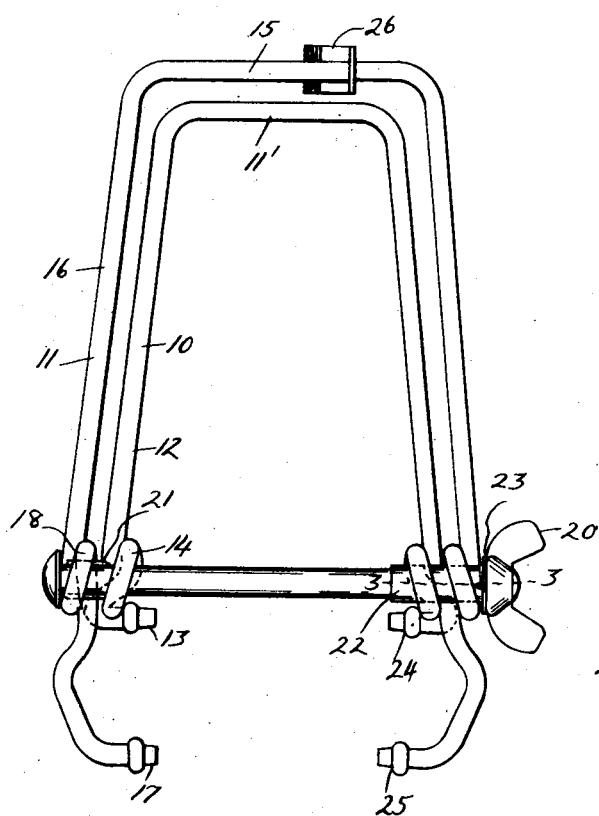
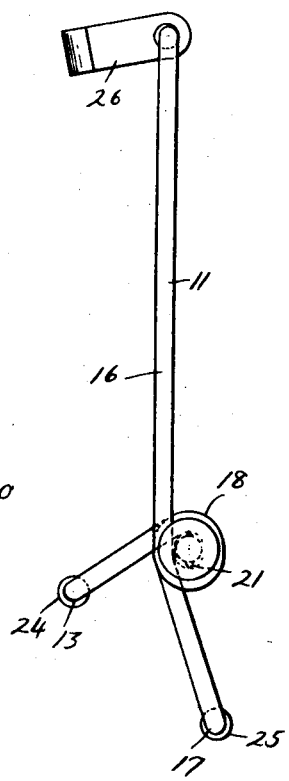
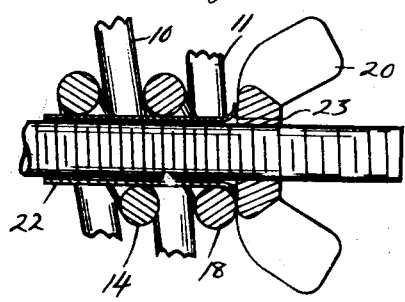
Inventor
William N. Booth

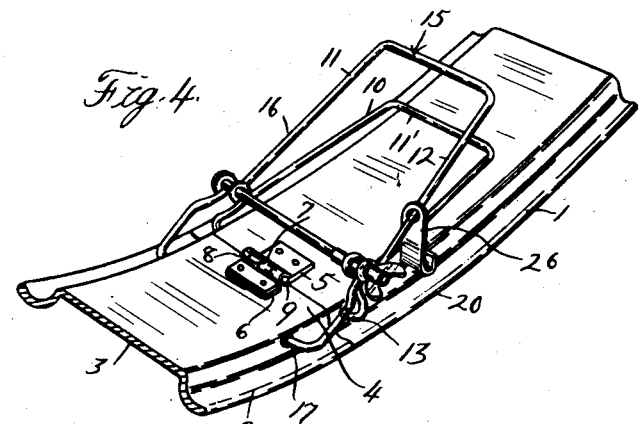
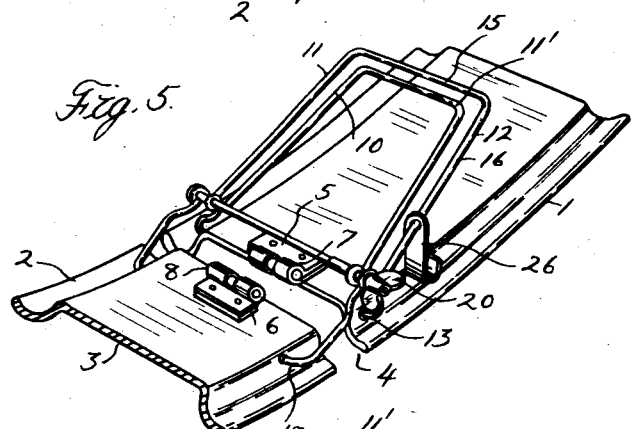
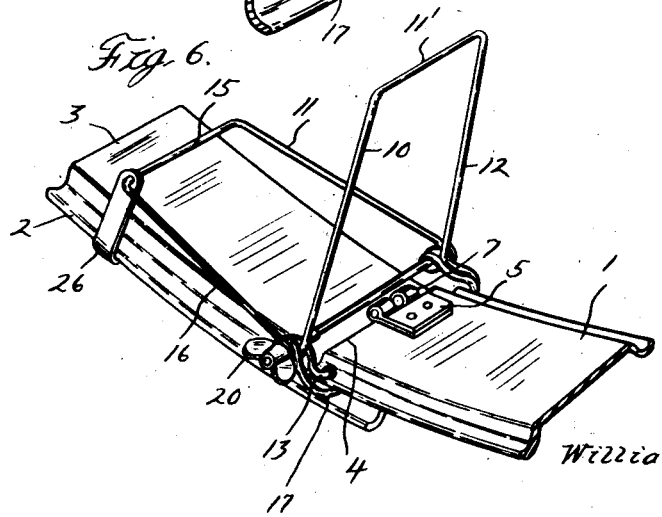

Patented June 11, 1929.

1,716,915

UNITED STATES PATENT OFFICE.

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK.

RIM TOOL.

Application filed May 4, 1925. Serial No. 28,030.

The invention relates to tools for contracting and expanding transversely split rims and more particularly tire carrying transversely split rims of the demountable type. The invention has for one of its objects the provision of a rim tool so constructed that it may be cheaply manufactured, readily connected to the rim and easily operated to contract and expand the rim. Another object is to provide a tool having cooperating frame members each formed of a wire having a portion movable inwardly into engagement with the rim and a shoulder portion engageable with the rim to limit the inward movement of the rim engaging portion. A further object is to provide a novel arrangement for holding the pivot of the frame members from rotation while adjusting thereon the nut for clamping the frame members upon the rim.

With these as well as other objects in view the invention resides in the novel features of construction and combinations and arrangements of parts as more fully hereinafter set forth.

In the drawings:—

Figure 1 is a plan view of a rim tool embodying my invention;

Figure 2 is a side elevation thereof;

Figure 3 is a cross section on the line 3—3 of Figure 1;

Figures 4, 5 and 6 are perspective views showing a portion of a transversely split demountable rim and having applied thereto the tool in different adjusted positions.

1 is the demountable rim of channel shape having the side flanges 2 and the base 3. This rim is transversely split at 4 and its ends are adapted to be suitably connected to each other as by means of the plates 5 and 6 secured to the respective ends and having the barrels 7 and 8 respectively which are adapted to be engaged in by the pintle 9.

10 and 11 are cooperating frame members of the rim tool, each being formed of a resilient wire bent into substantially U-shape. The base 11' of the U of the frame member 10 forms the handle portion while the normally diverging legs 12 form the lever portion. The legs have the transverse terminal portions 13 at their ends and extending inwardly toward each other and the coils 14 in alignment with each other and adjacent to the transverse terminal portions. The base 15 of the U of the frame member 11 forms the handle portion while the normally diverging legs 16 form the lever portion. These legs have the transverse terminal portions 17 at their ends extending inwardly toward each other and the aligned coils 18 adjacent to the transverse terminal portions. The frame member 10 is shorter and of less width than the frame member 11 and the coils of both frame members are aligned, with those of the frame member 10 located at the inner sides of those of the frame member 11. Furthermore the coils of the frame member 10 are located nearer the transverse terminal portions of this frame member than the coils 18 of the frame member 11 to the transverse terminal portions of the latter frame member. The transverse terminal portions of the legs of the frame members are engageable in pairs of aligned apertures in the side flanges 2 of the demountable rim, the pair of apertures engageable in by the transverse terminal portions of the frame member 10 being located nearer the split 4 than the other pair of aligned apertures.

For connecting the frame members 10 and 11 to each other to provide for the relative pivotal movement thereof I have provided the pivot 19 preferably in the nature of a bolt which extends through the aligned coils 14 and 18 of the frame members and is threadedly engaged by the thumb nut 20 which cooperates with the head of the bolt and is adapted to laterally force the transverse terminal portions of the frame members into engagement with their respective openings in the rim. For holding the bolt from rotation during the turning of the thumb nut thereon I preferably provide the bolt with the diametrically opposite fins or lugs 21 extending longitudinally of the bolt and located preferably near its head and make the coil 18 of the frame member 11 located adjacent to the head of the bolt eliptical so that the bolt with the fins or lugs may extend through the coil but cannot rotate relative thereto. For protecting the threads of the bolt I preferably provide the ferrule 22 which surrounds the threads and is engaged by the coils 14 and 18 of the frame members 10 and 11 respectively which are located at the threaded end of the bolt. This ferrule preferably has the annular flange 23 at one end which is adapted to be abutted by the thumb nut 20.

For the purpose of limiting the inward movement of the transverse terminal portions of the frame members while being forced into the openings in the rim so that they cannot damage the tire carried by the rim I have provided the integral shoulders 24 and 25 respectively upon the transverse terminal portions 13 and 17 and preferably formed by upsetting these transverse terminal portions.

To avoid the liability of weakening or cracking the frame members while being formed the portions of the legs of the frame members between their respective terminal portions and coils are preferably bowed outwardly to form a gradual bend. These outwardly bowed portions are so shaped that they will clear each other during the manipulation of the tool.

For the purpose of providing a rim tool which will be readily operated I have arranged the legs of the frame members so that the handle portions of the latter extend adjacent to each other when the rim tool is initially applied to the rim as shown in Figure 4 so that both handle portions may be gripped by the one hand while initially separating the ends of the rim. This is accomplished by inclining the portions of the legs 12 of the frame member 10 located between the terminal portions 13 and coils 14 to extend forwardly and downwardly from the longitudinal axes of the remaining portions of the legs. Also the portions of the legs 16 of the frame member 11 between the terminal portions 17 and the coils 18 are preferably inclined to extend upwardly and forwardly at a slight angle to the longitudinal axes of the remaining portions of the legs.

The rim tool is connected to the rim by engaging the transverse terminal portions 13 and 17 in the respective openings in the side flanges of the rim and turning up the thumb nut 20 to bring the parts into the position shown in Figure 4. The rim ends may then be separated by gripping the handle portions 11 and 15 of the frame members 10 and 11 respectively and moving the same toward each other, at which time the parts are in the position shown in Figure 5. The rim is then collapsed or contracted by holding the frame member 10 stationary and swinging the frame member 11 in a counterclockwise direction whereby the rim end connected to the frame member 11 is telescoped over the outer face of the rim end connected to the other frame member 10 thereby contracting or collapsing the rim, as shown in Figure 6. When the frame member 11 has been completely swung over to the inner face of the rim it may be secured in this position by suitable means such as the hook 26, which is slidably connected to the frame member 11 and has a hooked portion engageable with the beaded portion of the side flange 2.

From the above description it will be seen that I have provided a rim tool the frame members of which may be formed of resilient wire which may be easily bent to the desired shape, thereby reducing the cost of manufacture of the tool. Also the frame members are so shaped that they are not weakened and consequently may be made of wire stock approximately of the necessary size to withstand the strain to which it is subjected during the contracting and expanding of the rim. Furthermore it will be seen that I have provided a simple arrangement for holding the bolt from rotation and for limiting the inward movement of the portions of the frame members engageable in the openings of the rim.

What I claim as my invention is:

In a rim tool, the combination of a bolt, a U-shaped frame member having its legs coiled about said bolt and provided with transverse terminal portions for engagement with opposite sides of a rim near one of its ends, a cooperating U-shaped frame member of less width than said first mentioned frame member and having its legs coiled about said bolt and provided with transverse terminal portions for engagement with opposite sides of the rim near the other of its ends, a ferrule sleeved over the threaded portions of said bolt and engageable by the coils of the legs adjacent thereto, said ferrule having an annular flange at its outer end, and a nut threaded upon said bolt and engageable with said annular flange for adjusting said legs toward each other.

In testimony whereof I affix my signature.

WILLIAM N. BOOTH.